(No Model.)
C. LEDUC.
LIFE PRESERVER.
No. 282,651. Patented Aug. 7, 1883.
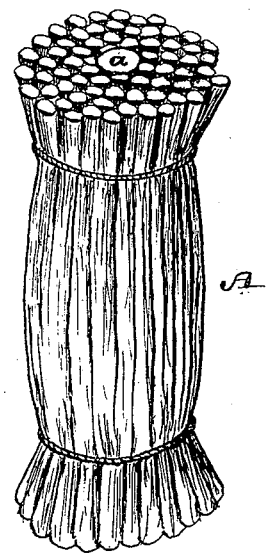
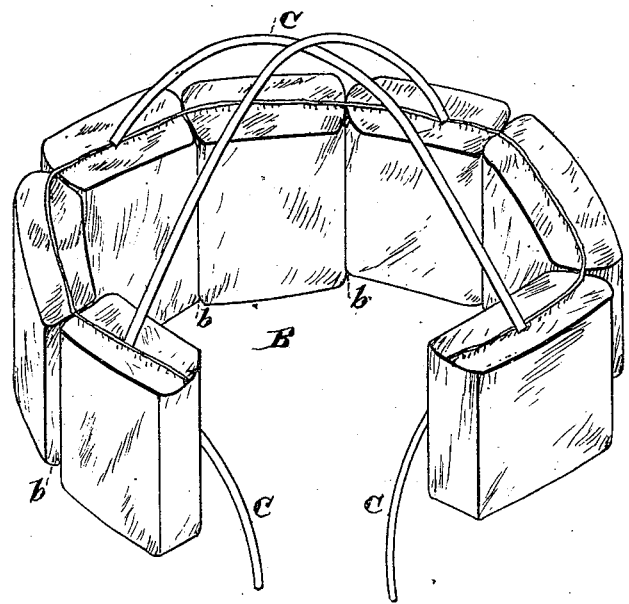

UNITED STATES PATENT OFFICE.

CONSTANT LEDUC, OF SAN FRANCISCO, CALIFORNIA.

LIFE-PRESERVER.

SPECIFICATION forming part of Letters Patent No. 282,651, dated August 7, 1883.

Application filed May 26, 1883. (No model.)

*To all whom it may concern:*

Be it known that I, CONSTANT LEDUC, of the city and county of San Francisco, State of California, have invented an Improvement in Life-Preservers; and I hereby declare the following to be a full, clear, and exact description thereof.

My invention relates to a new and useful life-preserver as an article of manufacture; and it consists in a suitable band, belt, mattress, or garment constructed wholly or in part of the dried stalks or stems of what is commonly known as "tule" or "tule-grass." This is a large club rush or sedge of the order *Cyperaceæ*, and known scientifically as *Scirpus validus*. It grows in marshy places, and, while found in several portions of the United States, is particularly abundant in California, where it grows to a great height, and its stems attain considerable diameter. These stems are very pithy, and when dried become very light and buoyant, whereby they are well adapted for the purpose of a life-preserver. They are not of such a loose texture as to become water-soaked, and will remain on the surface of the water for an indefinite time. The economy of this material recommends it, and its abundance and extreme lightness make it preferable to cork.

In the accompanying drawings I illustrate the manner in which I propose to use it.

Figure 1 represents a bunch of the stems; and Fig. 2 is a view of the ordinary form of life-preserver, the casing or outside fabric of which incloses a number of the tule bunches.

The bunch A is made up of a number of tule-stems, cut into lengths, and tied together at each end. These stems, before being thus bunched, are thoroughly dried or seasoned. They would be sufficiently stiff of themselves when tied firmly; but in order to insure the rigidity of the bunch I prefer to use a central core, *a*, made of some buoyant material, such as light wood.

The completed life-preserver B, as shown in Fig. 2, is made up of an outside casing of canvas, oil-cloth, or other fabric sewed up to form a bag, into which the bunches A are packed. Cross-seams *b* divide the bunches or sets of bunches and provide for the joints or bends of the article. The straps C are of usual form.

I do not confine myself to this particular form of life-preserver, as I may make it in the form of a garment or of a mattress.

Having thus described my invention, what I claim as new, and desire to secure by Letters Patent, is—

As a new article of manufacture, a life-preserver made of the bunches A of the dried stems or stalks of tule, each bunch having a central core, *a*, of light wood, substantially as herein described.

In witness whereof I have hereunto set my hand.

CONSTANT LEDUC.

Witnesses:
 C. D. COLE,
 J. H. BLOOD.